United States Patent [19]
Vyas et al.

[11] Patent Number: 5,247,599
[45] Date of Patent: Sep. 21, 1993

[54] STEAM RESISTANT OPTICAL FIBER CABLE

[75] Inventors: Mahesh K. Vyas, Cary; Paul E. Neveux, Jr., Bahama; Eric L. Buckland; Randy G. Schneider, both of Raleigh, all of N.C.

[73] Assignee: Sumitomo Electric Fiber Optics Corp., Research Triangle Park, N.C.

[21] Appl. No.: 893,720

[22] Filed: Jun. 5, 1992

[51] Int. Cl.$^5$ .............................................. G02B 6/44
[52] U.S. Cl. ..................................... 385/113; 385/109
[58] Field of Search ................ 385/113, 109, 107, 100

[56] References Cited

U.S. PATENT DOCUMENTS

| | | | |
|---|---|---|---|
| 4,577,925 | 3/1986 | Winter et al. | 385/113 |
| 4,593,970 | 6/1986 | Rhodes | 350/96.20 |
| 4,690,499 | 9/1987 | Taylor et al. | 350/96.23 |
| 4,696,543 | 9/1987 | Pitt et al. | 350/96.23 |
| 4,767,182 | 8/1988 | Parfree et al. | 350/96.23 |
| 4,893,895 | 1/1990 | Berthold et al. | 350/96.29 |
| 4,993,805 | 2/1991 | Abe et al. | 350/96.23 |

OTHER PUBLICATIONS

M. Vyas et al., "Design and Development of Steam Resistant Fiber Optic Cable", International Wire & Cable Symposium Proceedings, 1991, pp. 55-65.
M. Vyas et al., "Steam Resistant Fiber Optic Cable", 8th Annual National Fiber Optic Engineers Conference, Washington, D.C., Apr. 12-24, 1992, pp. 367-375.

Primary Examiner—John D. Lee
Assistant Examiner—Stephen W. Barns
Attorney, Agent, or Firm—Richard E. Jenkins

[57] ABSTRACT

A steam resistant optical fiber cable for use adjacent underground steam ducts in metropolitan locations. The optical fiber cable comprises polyethersulfone loose tubes for enhanced hydrolytic stability and a welded aluminum tube swaged over the fiber core to provide moisture imperviousness. The welded aluminum tube is bonded to the fiber core with an intermediate resin barrier layer to provide resistance to repeated cyclic flexing of the cable.

33 Claims, 3 Drawing Sheets

STEAM RESISTANT OPTICAL FIBER CABLE

TECHNICAL FIELD

The present invention relates generally to optical fiber cables and more particularly to a steam resistant optical fiber cable particularly adapted for use in a high temperature and high humidity environment.

RELATED ART

Steam damage of traditional twisted pair copper telecommunication cable has been a recurring problem in areas such as Manhattan, Philadelphia, Boston, and Cleveland for several decades. An early effort was made to solve this problem by encasing pulp insulated twisted pair copper cable in a solid jacket of lead. More recently during the 1970s when environmental issues surrounding oxidative leeching of lead compounds into the ground were first widely addressed, a cable design utilizing soldered overlap tin plate steel covered with polybutylene was introduced in the New York area. See "Polybutylene-Jacketed Air-Core PIC cables for use in Steam Exposed Ducts" J. D. Dykes & G. F. DeVeau, 23rd International Wire and Cable Symposium Dec. 5–7, 1972 pp. 387–392. Unfortunately, this cable construction design proved to be unsatisfactory due to the unanticipated recrystalization of the polybutylene after aging thereof. Subsequently, a new cable construction design was developed which utilized medium density polyethylene (MDPE) bonded to copolymer coated overlapped steel sheath. This sheath design proved to be satisfactory for twisted pair copper conductor air-core cable designs in moderate temperature underground ducts. However, replacement of the cables was periodically required in more severe locations where the cables were subjected to steam leaks.

The aforementioned sheath design for twisted pair copper cable has also been applied to waterproof filled optical fiber cables of the loose buffer tube-type for steam tunnel applications since about 1984–1985. Unfortunately, performance of these optical fiber cables has been found to be less than satisfactory and to be inherently subject to several major deficiencies. Firstly, the metal tapes utilized in the sheaths of the optical fiber cables are either a single longitudinally overlapped steel tape or a double layer of longitudinally overlapped metal tapes with the overlaps positioned 180° from each other. Thus, steam from a steam tunnel environment diffuses through the metal tape overlaps and enters the core of the optical fiber cables to the detriment thereof. The steam saturates the tubes, the jelly contained therein, and the UV acrylate protective layer of the optical fibers. Secondly, the loose tubes in the optical fiber cable constructions were made of polybutylene terephathalate (PBT) material which tends to degrade rapidly in the presence of moisture and high temperatures. Once the loose tubes of the optical fiber cable were degraded by the heat and moisture of the steam tunnel environment, the optical fibers therein would eventually break.

Therefore, there is a long-felt need for an optical fiber cable construction which is capable of underground installation adjacent to steam ducts in major metropolitan areas (such steam ducts typically transporting steam as high as 400° F. and 400 psi) wherein the steam ducts are prone to periodic failure or continuous steam leakage during which the temperature of escaping steam typically reaches 270° F. and results in catastrophic optical fiber cable failure.

DISCLOSURE OF THE INVENTION

In accordance with the present invention, applicant provides a novel steam resistant optical fiber cable comprising at least one optical fiber loosely positioned within at least one protective plastic tube having a jelly-like material therein filling the space around the optical fiber. The plastic tube possesses hydrolytic stability against degradation for at least 60 days at 100% relative humidity and 100° C. temperature. A plastic sheath is provided to surround the plastic tube, and a split metallic tube is closed around the plastic sheath and welded to provide a moisture impervious envelope therearound wherein the weld contains pinholes no larger than 100 micrometers in diameter.

It is therefore the object of the present invention to provide an optical fiber cable capable of reliable long term operation when exposed to a high temperature steam environment.

It is another object of the present invention to provide an optical fiber cable which is both hydrolytically stable and high temperature stable.

It is still another object of the present invention to provide an optical fiber cable which is moisture impervious in a high temperature steam environment.

It is still another object of the present invention to provide a steam resistant optical fiber cable which can be subjected to repeated cyclic flexing without detrimental effect to the cable efficiency and longevity.

Some of the objects of the invention having been stated, other objects will become evident as the description proceeds when taken in connection with the accompanying drawings described hereinbelow.

BEST MODE FOR CARRYING OUT THE INVENTION

Figure 1:
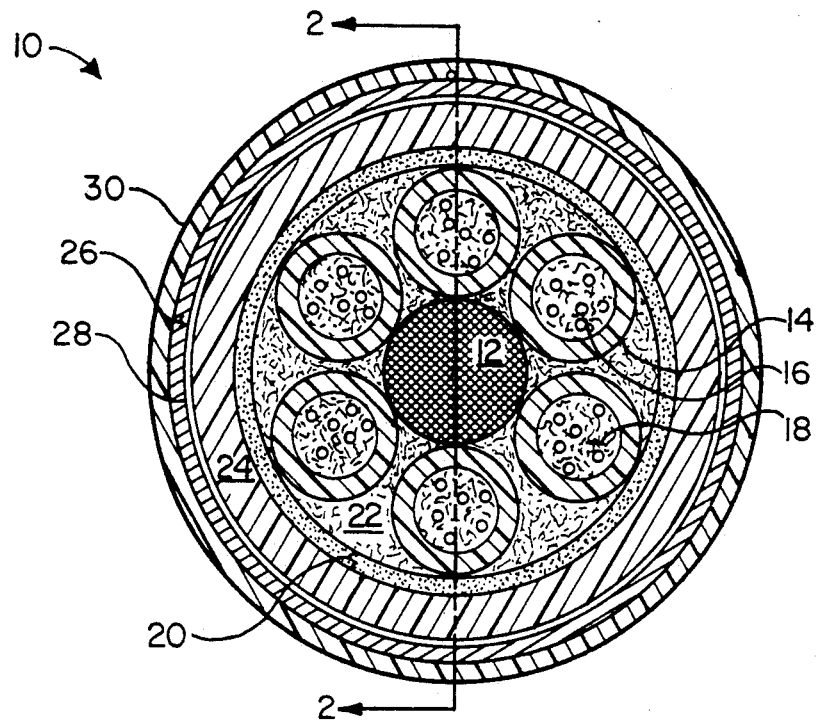
FIG. 1 is a vertical cross sectional view of a representative embodiment of the invention.
Figure 2:
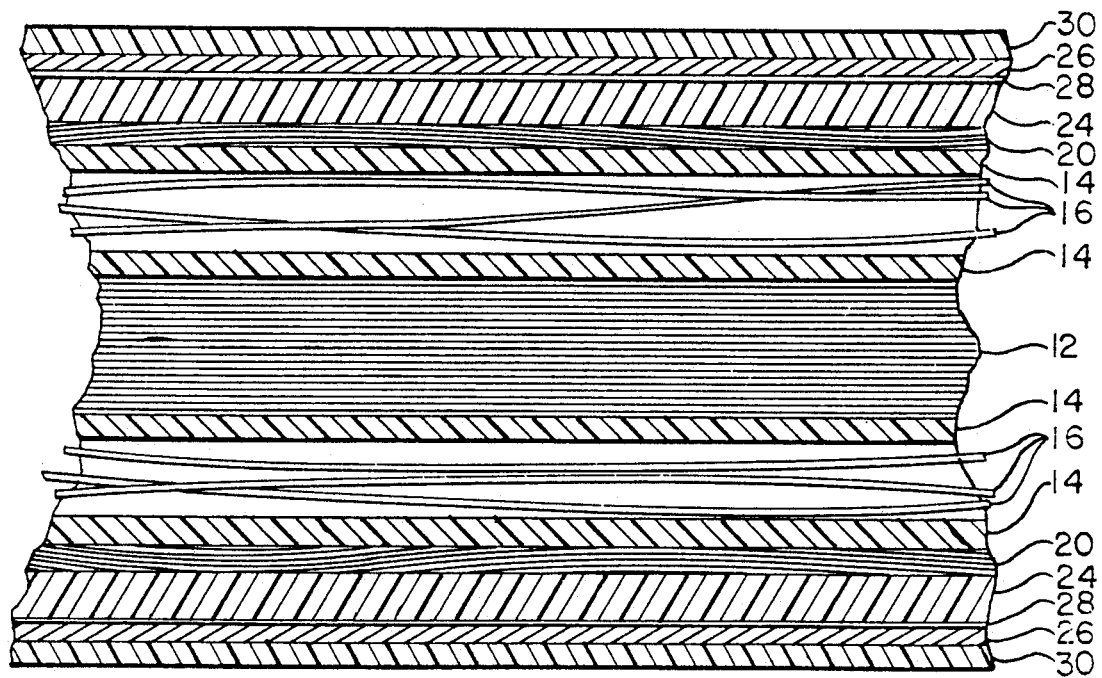
FIG. 2 is a view taken along the lines 2—2 of FIG. 1.

Referring now more specifically to the drawings, a preferred embodiment of the steam resistant optical fiber cable made according to the present invention is shown in FIGS. 1 and 2 and generally designated 10. Cable 10 is a loose tube cable construction configuration comprising a central strength member 12 surrounded by a plurality of loose tubes 14. Loose tubes 14 each contain a plurality of optical fibers 16 and are filled with a suitable water-blocking jelly material 18. A layer of aramid yarns 20 surrounds loose tubes 14 and the interstices between the loose tubes and layer 20 are also filled with a suitable water-blocking jelly material 22.

Still referring to FIGS. 1 and 2, cable 10 further comprises an inner sheath 24 surrounding aramid yarn layer 20 and a split metallic tube 26 is drawn down over inner sheath 24 and welded together. An intermediate resin barrier layer 28 is provided beneath split metallic tube 26 to permit bonding thereof to inner sheath 24 so as to prevent differential movement therebetween and to thereby enhance hermeticity and bending performance of cable 10. Finally, an outer sheath 30 is applied over split metallic tube 26 in the cable construction shown in FIGS. 1 and 2 of the drawings.

Figure 3:
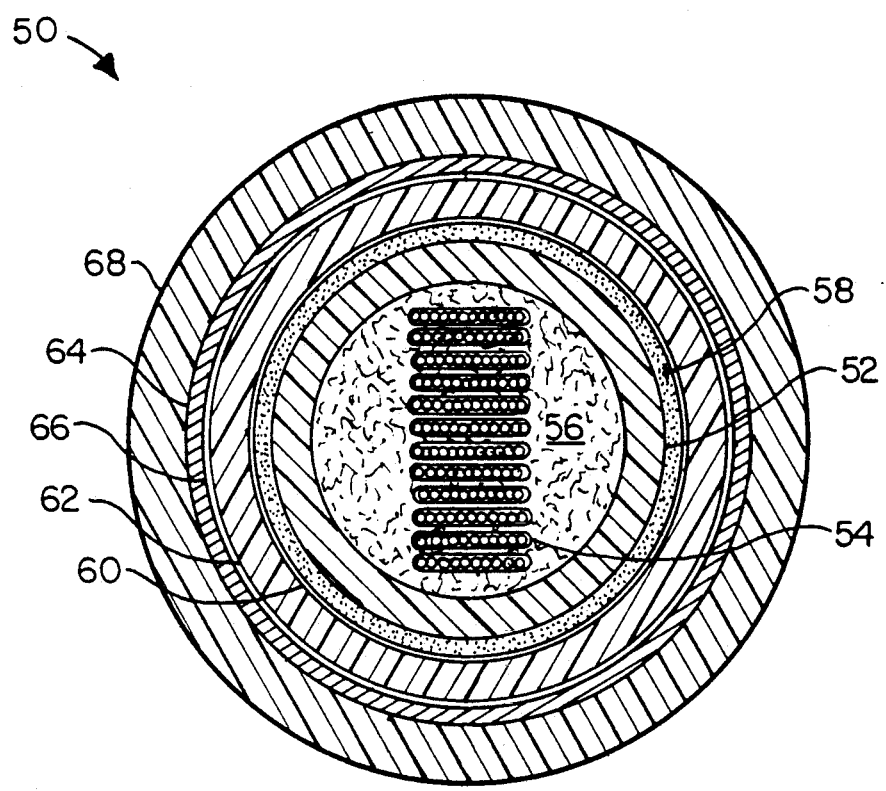
FIG. 3 is a vertical cross sectional view of another representative embodiment of the invention consisting of a single central loose tube design.

FIG. 3 depicts a vertical cross section of a single central loose tube design generally designated 50. Central loose tube 52 surrounds individual fibers 54 (or groups of fibers, planar arrays of fiber ribbon, a plurality of thread-bound groups of fibers, or a plurality of thread-bound planar arrays of fiber ribbons). A suitable waterblocking thixotropic jelly 56 sufficiently fills the space between fibers 54 (or groups of fibers or fiber ribbons, etc.) and the interior wall of central loose tube 52. Central loose tube 52 comprises thermal and hydrolitically resistant polymer material. A layer of aramid yarns 58 surrounds central loose tube 52 and the interstices between the loose tube and layer are also filled with a suitable water-blocking jelly material 60.

Still referring to FIG. 3, cable 50 further comprises an inner sheath 62 surrounding aramid yarn layer 58 and a split metallic tube 64 is drawn down over inner sheath 62 and welded together. An intermediate resin barrier layer 66 is provided between split metallic tube 64 to permit bonding thereof to inner sheath 62 so as to prevent differential movement therebetween and to thereby enhance hermeticity and bending performance of cable 50. An optional extruded bedding layer may be coextruded under the intermediate resin layer in order to facilitate subsequent swaging of the split metallic tube 64. Finally, an outer sheath 68 is applied over split metallic tube 64. An optional layer of flooding compound is applied over the split metallic tube 64 prior to the extrusion of the outer sheath 68 to enhance the corrosion resistance of the split metallic tube 64 and to adhere outer sheath 68 to split metallic tube 64.

Other cable constructions are clearly contemplated as being within the scope of the present invention which will be described in greater specificity hereinbelow.

Having generally described preferred embodiments of applicant's steam resistant optical fiber cable above, applicant would now like to more specifically point out the novel features of steam resistant optical fiber cables 10 and 50, respectively. In order to achieve the desired hydrolytic stability and moisture imperviousness necessary for a successful steam resistant cable construction, applicant utilized polyethersulfone material for loose tubes 14 and 52, respectively, rather than conventional polybutylene terephathalate (PBT). This improved tube material possesses both high temperature hydrolytic stability as well as provides an improved diffusion barrier to water to protect optical fibers 16 and 54, respectively, contained within the tube. When loose tubes 14 and 52 are formed from polyethersulfone the catastrophic failure of the loose tubes requires at least 50 times as long to occur as when formed from conventional polybutylene terephathalate (PBT) in conventional sheath cables.

Secondly, to achieve the necessary moisture imperviousness for use of cables 10 and 50 in a heated steam environment, split metallic tubes 26 and 64 comprise a welded aluminum tube to encase inner sheaths 24 and 62 which applicant has determined can reduce the diffusion rate to approximately 1/1000 to 1/100,000 of the rate using conventional longitudinal overlap metallic sheath technology which has proven ineffective to prevent steam ingress and subsequent catastrophic failure of optical fibers 16 and 54 contained in loose tubes 14 and 52.

Aluminum tubes 26 and 64 are most suitably swaged down over inner sheaths 24 and 62 and bonded thereto with a layer of an adhesive graft polyethylene material 28 and 66 (also referred to herein as intermediate resin barrier layer) which covers the outer surface area of inner sheaths 24 and 62. Applicant has discovered that the use of a subsequent induction heating process will cause aluminum tubes 26 and 64 to bond to the heat activated adhesive graft polyethylene material 28 and 66 such that cables 10 and 50 can withstand repeated cyclic flexing without causing metallic tubes 26 and 64 to crack or buckle. Finally, outer sheaths 30 and 68 formed from high density polyethylene (HDPE) are applied over aluminum tubes 26 and 64 to facilitate installation of cables 10 and 50.

Applicant wishes to observe that central strength member 12, jelly material 22 and 60, and inner sheaths 24 and 62 may all be formed from suitable conventional materials which would be well known to one skilled in the art. Jelly materials 18 and 56 require careful selection due to thermal and hydrolytic instability of many thixotropic waterblocking loose tube jellies utilized for conventional applications. In the alternative, inner sheaths 24 and 62 could also be formed from polyethersulfone such as used to form the loose tubes in order to further enhance the steam resistant performance of cables 10 and 50.

Thus, applicant has discovered a synergistic increase in heated steam resistance from a new cable construction which utilizes hydrolytically stable polyethersulfone for loose tubes 14 and 52 in place of easily degradable polybutylene terephathalate (PBT). Polyethersulfone loose tubes 14 and 52 also serve as a secondary moisture barrier to protect optical fibers 16 and 54 from exposure to moisture in addition to being degradation resistant. Polyethersulfone loose tubes 14 and 52 possess hydrolytic stability against heated steam degradation for at least 60 days at 100% relative humidity and 100° C. temperature, and are temperature stable to at least 120°–130° C.

A study of both PBT and PES tubes aged in DRY LAP sheath was conducted to observe the change in Melt Flow Index from the original value. The change in Melt Flow Index of a polymer relates directly to the breakdown of polymeric chains. Cables were prepared containing PBT and PES tubes. A DRY LAP sheath was applied. Cables were subjected to continuously 100° C. boiling water for specific time periods. Melt Flow Index was conducted on recovered tubes from the cables and compared to Melt Flow Index data of unaged tubes. The results are set forth in Table 1 below.

TABLE 1

| | Aging Time (days) in 100° C. water | | | | | |
|---|---|---|---|---|---|---|
| | 0 | 7 | 10 | 20 | 30 | 60 |
| PBT $\frac{MFI}{MFI_o}$ | 1.0 | 1.3 | 1.8 | 10 | >100 | >>100 |
| PES $\frac{MFI}{MFI_o}$ | 1.0 | 1.11 | 1.22 | — | — | 1.4 |

The degradation rate R of the polymeric material is expressed by the logarithm of the normalized Melt Flow Rate with respect to time. Thus, from the above table, R = 0.075 for PBT and R = 0.0012 for PES, indicating that PBT physically degrades at a rate 62.5 times the rate of PES in the same 100° C. water condition. Additionally, TGA measurements on the same PES samples show negligible change in the sublimation onset temperature through the aging cycle as seen in Table 2 below.

TABLE 2

| | Aging Time (days) in 100° C. water | | | | | |
|---|---|---|---|---|---|---|
| | 0 | 7 | 10 | 20 | 30 | 60 |
| TGA Onset Temp °C. | 574 | 573 | 572 | — | 565 | 562 |

From this data set we conclude that PES may be expected to have a lifetime at least 50 times greater than PBT in this environment.

In the steam duct environment, stresses are imposed on the tube jellies 18 and 56 as well. Both heat and moisture can adversely affect loose tube jelly compounds. For this application special jellies must be formulated so that the jelly retains its thixotropic behavior. The jellies must not experience syneresis, i.e., the separation of oil and the thixotropic agent, typically fumed silica. When syneresis occurs, pools of oil can form in splice enclosures leaving a hard glass matrix behind and attenuation loss will increase. Under the high temperatures of a steam duct, many commercially available jellies exhibit syneresis. To prevent syneresis from occurring, special oil separation inhibitors must be added to prevent the migration of oil in the cable. Both the oil separation inhibitor and the base oil material must additionally be able to resist thermal degradation and hydrolysis.

Thermal degradation of oils is evidenced by a thickening of the oil caused by thermal polymerization. When the viscosity of the oil increases, the jelly begins adding stress to the fiber stress and attenuation loss is exhibited. Materials which are most susceptible to these reactions are oils which contain tertiary or quaternary carbons, e.g. polybutenes. These functional groups can easily form radicals in the presence of oxygen and heat. The radicals can form bonds to adjacent carbon chains of oil forming higher molecular weight, and hence higher viscosity, oils.

Hydrolysis of the oil and/or oil separation inhibitor is indicated also by the release of low molecular weight components which threaten the reliability of the optical fiber U.V. acrylate coating. For example, some commercially available loose tube jellies use triglycerides, the basis of which is glycerine (1, 2, 3 propanetriol). Heat and moisture can break apart the ester bond between the glycerine molecule and the fatty acid. The glycerine molecule is then able to permeate through the optical fiber U.V. acrylate coating and cause delamination.

It is well known that oils that have a high naphthenic content to them have a tendency to cause rubber to swell (see ASTM D 471). At elevated temperatures, oils which have naphthenic components can also cause some U.V. acrylate coatings of optical fibers to swell and loose the properties they were designed to have to protect the optical fiber. It is important that the thixotropic oils be completely free of naphthenic components.

Applicant has found such a jelly meeting these requirements. The loose tube jelly can be described as having the following characteristics:

| | |
|---|---|
| Viscosity: | 3,500–5,500 Ps (Brookfield) |
| Critical Yield: | 35 Pa–100 Pa |
| Cone Penetration at −40° C.: | ≧200 1/10 mm |
| Cone Penetration at +25° C.: | 350–410 1/10 mm |
| Average Molecular Weight of Base Oils | 340–450 g/mole |
| Composition: | Linear Aliphatic Oils |
| Anti-oxidant: | 0.5% (wt/wt) of Hindered Phenol |

The preferred tube jelly material 18 is commercially available as R1735 from Master Adhesives, Norcross, Ga.

In addition to the benefits achieved through the use of polyethersulfone loose tubes 14 and 52 (and, alternately, the additional use of polyethersulfone for inner sheaths 24 and 62) with respect to enhanced hydrolytic stability of cables 10 and 50, and selected thermal and hydrolytically stable tube jelly, applicant also utilizes welded aluminum tubes 26 and 64 to retard moisture ingress into the core of cables 10 and 50. To maximize moisture imperviousness, applicant chose a welded aluminum tube on the basis that moisture permeability through the tube will be significantly lower since in conventional manufacturing pinholes therein greater than 100 micrometers can be eliminated. Applicant has discovered that by using welded aluminum tubes 26 and 64 cables 10 and 50 possess about 3 to 6 orders of magnitude better water imperviousness than with conventional plain sheathed cable. With the use of optimized manufacturing process parameters, the frequency of the pinholes of about 100 micrometers would be about 1 in 20 to 30 kilometers of processed cable. Many times the pinhole will be only a partially filled gap, and all such pinholes would preferably be filled off-line once detected to ensure enhanced hermeticity of cables 10 and 50.

Also, applicant has discovered that any differential movement of intercomponents of the cables 10 and 50 lends to cracking of aluminum tubes 26 and 64. In order to meet standard mechanical repeated cyclic flexing requirements, applicant found an optimum cable construction to utilize high elongation aluminum for metallic tubes 26 and 64 (alloy 1145 or 1350 as per alloy designation, 99.5% aluminum content). The higher elongation aluminum used for welded aluminum tubes 26 and 64 possesses tensile strength of greater than or equal to 13 KSI with a yield strength of greater than or equal to 11 KSI to obviate any cracking. In combination with higher elongation aluminum tubes 26 and 64 (e.g., elongation of greater than or equal to 8%) applicant utilizes an intermediate resin barrier layer 28 and 66 beneath aluminum tubes 26 and 64 to permit bonding to inner sheaths 24 and 62 so as to avoid the aforementioned differential intercomponent movement during repeated cycles flexing and to thereby avoid cracking of aluminum tubes 26 and 64. Such an intermediate resin barrier layer can be constructed of grafted polyethylene under the trade name "Plexar" which is available from Quantum Chemical as PXTR015.

Figure 4:
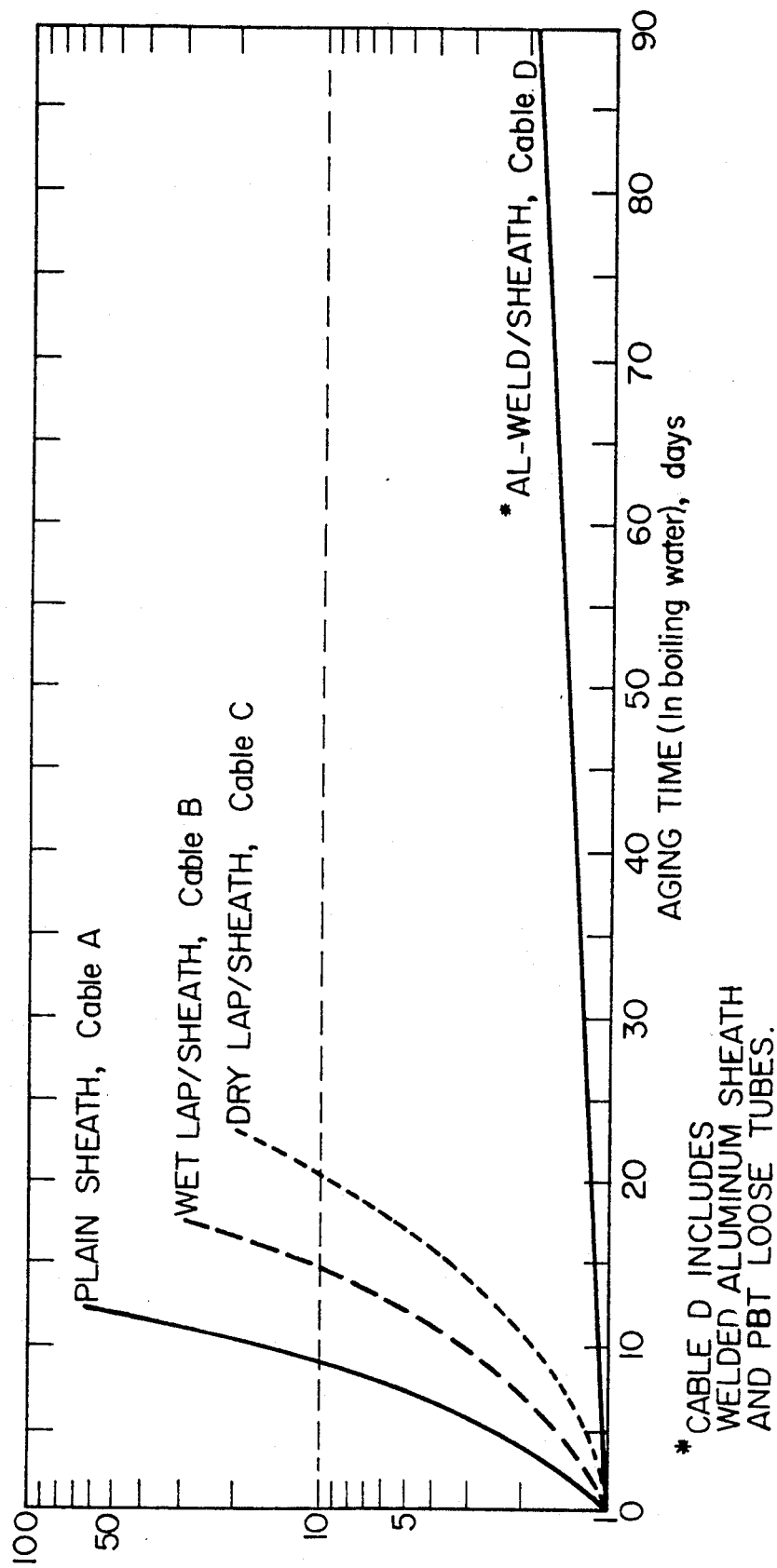
FIG. 4 is a chart contrasting performance of a cable made in accordance with the present invention with selected prior art cable constructions.

FIG. 4 illustrates the performance of cable 10 of FIGS. 1 and 2 incorporating aluminum tube 26 as opposed to conventional cable constructions. Referring to FIG. 4, one can observe the time dependence of the onset of polybutylene terephathalate (PBT) Melt Flow Index degradation (MFI) as a function of sheath type for cables immersed in boiling water. The catastrophic failure of prior art cables demonstrated that PBT degrades in the presence of moisture and high temperature. Applicant concluded that by measuring the degradation of PBT with time one can monitor the influx of moisture into the core of an optical fiber cable. The variable in the cables set forth in FIG. 4 is the percentage of circumferential void in the metal sheath surrounding the core. Focusing on the 10.0 normalized MFI dotted line, (an arbitrary selected point) it can be observed that for plain sheath cable A (a cable without a metal layer) the time to reach the 10.0 MFI is nine days. A WETLAP/sheath cable B with approximately a 99% coverage of the core by a metal layer only improves this time to decay to 10.0 MFI to 15 days. A yet further reduction in the "gap" resulting from use of DRYLAP/sheath cable C with a metal coverage of approximately 99.6% improves the time to decay to only 20 days.

Thus, it can be observed that providing metallic coverage of 99.6% only improves the life expectancy of an optical fiber cable with PBT tubes by a factor of 2 (20 days versus 9 days) as compared to the use of no metallic coverage at all. This is a significant discovery since prior optical fiber cable constructions utilized in steam environments were constructed of one or two layers of overlapped metal sheaths which were erroneously believed to provide about 50 times more protection than plain sheaths. This view of the diffusion resistance of metallic bonded sheaths was based upon results reported by E. D. Metcalf at the 21st International Wire & Cable Symposium Dec. 5-7, 1972 in his paper entitled "A Bonded, Non-Corrugated Aluminum/Polyethylene Sheathing System for Telephone Cable" pp. 235-239. Referring to FIG. 6 on page 238 note that the rate of moisture diffusion through Alpeth was 20 or more times greater than the ALP-MRP. The ALP-MRP sheath in this case was similar to the "WET LAP" of the applicants data while the SEALMETIC sheath of FIG. 6 was similar in construction to applicants "DRY LAP" sheath. Metcalf reported that the SEALMETIC sheath maintained a moisture barrier ratio of more than 1000 to 1 compared to a cable with performance like applicants cable A in tests conducted at 120° F.-150° F.

Applicant's data clearly points out an unexpected degradation of the permeation resistance of bonded overlapped sheaths at temperatures of 212° F. and higher wherein such change manifests itself as a change in the performance ratio from 1000 to 1 at 120° F.-150° F. to only 2 to 1 at 212° F.

Referring again to FIG. 4, if one extrapolates the curve of cable D to the 10.0 MFI line the life expectancy is found to be 420 days or about 45 times the value of plain sheath cable A.

The aluminum tube for this prototype cable contained 10 to 30 pinholes smaller than 100 micrometer diameter per meter and represents the lower limit of the acceptable use of the invention. Applicant's recent improvements in perfecting the welding technique has resulted in cable containing less than 1 pinhole per meter with less than 1 100 micrometer pinhole per 20-30 cable km. However, in addition to the use of welded aluminum tube 26 as incorporated in cable D in FIG. 4, applicant's invention further utilizes polyethersulfone rather than PBT to form loose tubes 14 which renders them both resistant to thermal and humidity degradation as well as provides an additional moisture diffusion resistance barrier to protect the acrylate coatings of optical fibers 16. The additional use of polyethersulfone in loose tubes 14 (not used in cable D shown in FIG. 4) enhances diffusion resistance of the welded aluminum tube steam resistant cable by approximately two additional orders of magnitude.

In order to verify performance, samples of applicant's improved cable, possessing both PBT and PES tubes for comparison, and having unfilled pinholes less than 100 micrometer at a rate of 10-30 per meter, were subjected to 270° C. steam at 20-30 psi for 30 days. The cable was dissected upon removal from this severe condition. PBT tubes, including a PBT with measured hydrolitic stability three times that of conventional PBT (Huls vestodur 3020 versus Huls Vestodur 3000), had disintegrated to dust. PES tubes maintained fully structural integrity and flexibility. TGA onset temperature and DSC transition temperatures of a PES tube provides further verification of the material stability as shown in Table 3 below.

TABLE 3

|  | Days Exposure 270° F. | |
|---|---|---|
|  | 0 | 30 |
| TGA Onset Temp °C. | 549 | 530 |
| DSC Transition Temp | 223 | 223 |

These results indicate first that PES is a highly reliable material under some of the most severe steam environments. Second, any hydrolysis susceptible tube material is unacceptable even under a nominally hermetic sheath, as the presence of any pinhole or other cut through such as may occur during a difficult installation can lead to local catastrophic failure of the tube.

Thus, applicant has discovered a highly synergistic effect provided by utilizing polyethersulfone to form loose tubes 14 and 52 in cable 10 and 50, respectively, (and optionally also inner sheaths 24 and 62) in combination with a selected tube filling compound and in combination with providing welded aluminum tubes 26 and 64 over inner sheaths 24 and 62 in order to create an extremely efficient steam resistant optical fiber cable construction which can now be fully appreciated by one skilled in the art in view of the detailed descriptions set forth hereinabove.

It will be understood that various details of the invention may be changed without departing from the scope of the invention. Furthermore, the foregoing description is for the purpose of illustration only, and not for the purpose of limitation—the invention being defined by the claims.

What is claimed is:

1. A steam resistant optical fiber cable comprising:
   at least one optical fiber loosely positioned within at least one protective plastic tube and a jelly-like material filling the space around said optical fiber, said plastic tube possessing hydrolytic stability against degradation for at least 60 days at 100% relative humidity and 100° C. temperature;
   a plastic sheath surrounding said plastic tube; and
   a split metallic tube which has been closed around said plastic sheath and welded to provide a moisture impervious envelope, and wherein said weld contains pinholes no larger than 100 micrometers in diameter.

2. A steam resistant cable according to claim 1 wherein said at least one optical fiber comprises a plurality of optical fibers.

3. A steam resistant cable according to claim 2 wherein said at least one protective plastic tube comprises a plurality of plastic tubes.

4. A steam resistant cable according to claim 1 wherein said plastic tube comprises polyethersulfone.

5. A steam resistant cable according to claim 1 wherein said jelly-like material comprises a thermal degradation and hydrolysis-resistant jelly possessing the following characteristics:

| | | |
|---|---|---|
| Viscosity: | 3,500–5,500 | Ps (Brookfield) |
| Critical Yield: | 35 Pa-100 | Pa |
| Cone Penetration at −40° C.: | ≧200 1/10 | mm |
| Cone Penetration at +25° C.: | 350–410 1/10 | mm |
| Average Molecular Weight of Base Oils: | 340–450 | g/mole |
| Composition: | | Linear Aliphatic Oils |
| Anti-oxidant: | 0.5% | (wt/wt) of Hindered Phenol |

6. A steam resistant cable according to claim 1 wherein said plastic sheath comprises polyethersulfone.

7. A steam resistant cable according to claim 1 wherein said split metallic tube comprises aluminum.

8. A steam resistant cable according to claim 7 wherein said aluminum tube is swaged on said plastic sheath.

9. A steam resistant cable according to claim 1 including an adhesive resin layer between said plastic sheath and said welded metallic tube for bonding together thereof.

10. A steam resistant cable according to claim 1 wherein said pinholes of about 100 micrometers in diameter occur no more often than about 1 per 20–30 kilometers of optical fiber cable.

11. A steam resistant cable according to claim 10 wherein said pinholes are filled during processing of said optical fiber cable.

12. A steam resistant cable according to claim 1 wherein said weld includes no more than 1 pinhole per meter.

13. A steam resistant cable according to claim 1 wherein an outer plastic sheath surrounds said metallic tube.

14. A steam resistant cable according to claim 13 wherein said outer plastic sheath comprises high density polyethylene.

15. A steam resistant optical fiber cable comprising:
at least one optical fiber loosely positioned within at least one protective polyethersulfone tube and a jelly-like material filling the space around said optical fiber, said polyethersulfone tube possessing hydrolytic stability against degradation for at least 60 days at 100% relative humidity and 100° C. temperature;
a plastic sheath surrounding said plastic tube; and
a split aluminum tube which has been swaged on said plastic sheath and welded to provide a moisture impervious envelope, and wherein said weld contains pinholes no larger than 100 micrometers in diameter.

16. A steam resistant cable according to claim 15 wherein said at least one optical fiber comprises a plurality of optical fibers.

17. A steam resistant cable according to claim 16 wherein said at least one protective polyethersulfone tube comprises a plurality of polyethersulfone tubes.

18. A steam resistant cable according to claim 15 wherein said plastic sheath comprises polyethersulfone.

19. A steam resistant cable according to claim 15 wherein said jelly-like material comprises a thermal degradation and hydrolysis-resistant jelly possessing the following characteristics:

| | | |
|---|---|---|
| Viscosity: | 3,500–5,500 | Ps (Brookfield) |
| Critical Yield: | 35 Pa-100 | Pa |
| Cone Penetration at −40° C.: | ≧200 1/10 | mm |
| Cone Penetration at +25° C.: | 350–410 1/10 | mm |
| Average Molecular Weight of Base Oils: | 340–450 | g/mole |
| Composition: | | Linear Aliphatic Oils |
| Anti-oxidant: | 0.5% | (wt/wt) of Hindered Phenol |

20. A steam resistant cable according to claim 15 including an adhesive resin layer between said plastic sheath and said welded aluminum tube for bonding together thereof.

21. A steam resistant cable according to claim 15 wherein said pinholes of about 100 micrometers in diameter occur no more often than about 1 per 20–30 kilometers of optical fiber cable.

22. A steam resistant cable according to claim 21 wherein said pinholes are filled during processing of said optical fiber cable.

23. A steam resistant cable according to claim 15 wherein said weld includes no more than 1 pinhole per meter.

24. A steam resistant cable according to claim 15 wherein an outer plastic sheath surrounds said metallic tube.

25. A steam resistant cable according to claim 24 wherein said outer plastic sheath comprises high density polyethylene.

26. A steam resistant optical fiber cable comprising:
a plurality of optical fibers loosely positioned within a plurality of protective polyethersulfone tubes and a jelly-like material filling the space around said optical fibers, said polyethersulfone tubes possessing hydrolytic stability against degradation for at least 60 days at 100% relative humidity and 100° C. temperature;
a plastic sheath surrounding said plastic tube;
a split aluminum tube which has been swaged on said plastic sheath and welded to provide a moisture impervious envelope, and wherein said weld contains pinholes no larger than 100 micrometers in diameter which occur no more often than about 1 per 20–30 kilometers of optical fiber cable; and
an adhesive resin layer between said first plastic sheath and said welded aluminum tube for bonding together thereof.

27. A steam resistant cable according to claim 26 wherein said plastic sheath comprises polyethersulfone.

28. A steam resistant cable according to claim 26 wherein said jelly-like material comprises a thermal degradation and hydrolysis-resistant jelly possessing the following characteristics:

| | | |
|---|---|---|
| Viscosity: | 13,500–5,500 | Ps (Brookfield) |
| Critical Yield: | 35 Pa-100 | Pa |
| Cone Penetration at −40° C.: | ≧200 1/10 | mm |
| Cone Penetration at +25° C.: | 350–410 1/10 | mm |
| Average Molecular Weight of Base Oils: | 340–450 | g/mole |
| Composition: | | Linear Aliphatic Oils |
| Anti-oxidant: | 0.5% | (wt/wt) of |

-continued

Hindered Phenol

29. A steam resistant cable according to claim 26 wherein said pinholes are filled during processing of said optical fiber cable.

30. A steam resistant cable according to claim 26 wherein said weld includes no more than 1 pinhole per meter.

31. A steam resistant cable according to claim 26 wherein an outer plastic sheath surrounds said metallic tube.

32. A steam resistant cable according to claim 31 wherein said outer plastic sheath comprises high density polyethylene.

33. A steam resistant cable according to claim 26 including a longitudinally extending strength member positioned centrally within said plastic sheath with said plurality of polyethersulfone tubes located radially outwardly therefrom.

* * * * *